US012668220B2

(12) United States Patent (10) Patent No.: US 12,668,220 B2
Ganzel (45) Date of Patent: Jun. 30, 2026

(54) HYDRAULIC BRAKE BOOST

(71) Applicant: ZF Active Safety US Inc., Livonia, MI (US)

(72) Inventor: Blaise J. Ganzel, Ann Arbor, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 675 days.

(21) Appl. No.: 18/073,622

(22) Filed: Dec. 2, 2022

(65) Prior Publication Data

US 2024/0067144 A1 Feb. 29, 2024

Related U.S. Application Data

(60) Provisional application No. 63/402,526, filed on Aug. 31, 2022.

(51) Int. Cl.
B60T 8/36 (2006.01)
B60T 7/04 (2006.01)
(Continued)

(52) U.S. Cl.
CPC .............. B60T 8/368 (2013.01); B60T 7/042 (2013.01); B60T 8/17 (2013.01); B60T 8/4081 (2013.01); B60T 17/043 (2013.01); B60T 8/4872 (2013.01)

(58) Field of Classification Search
CPC . B60T 8/176; B60T 8/409; B60T 8/17; B60T 8/26; B60T 8/404; B60T 8/326;
(Continued)

(56) References Cited

U.S. PATENT DOCUMENTS 4,865,399 A * 9/1989 Atkins .................. B60T 8/4291
303/61
9,446,753 B2 9/2016 Feigel et al.
(Continued)

FOREIGN PATENT DOCUMENTS

DE 102016210953 A1 12/2017
DE 102022201760 A1 9/2022
WO WO-2019195542 A1 * 10/2019 ............ B60T 13/166

OTHER PUBLICATIONS

Search report for corresponding application No. 102023207944.5, mailing date of Oct. 6, 2024, 12 pages.

*Primary Examiner* — Robert A. Siconolfi
*Assistant Examiner* — San M Aung
(74) *Attorney, Agent, or Firm* — Tarolli, Sundheim, Covell & Tummino LLP

(57) ABSTRACT

A brake system for actuating front and rear wheel brakes includes a reservoir and a master cylinder operable during a manual push-through mode by actuation of a brake pedal to generate brake actuating pressure at a first output for hydraulically actuating the pair of front wheel brakes. A power transmission unit is configured for selectively providing pressurized hydraulic fluid for actuating the pair of front wheel brakes and the pair of rear wheel brakes during a braking event. First and second two-position three-way valves are provided. Each three-way valve is hydraulically connected with the master cylinder, the power transmission unit, and a selected one of the front wheel brakes. Each of the first and second three-way valves selectively controls hydraulic fluid flow from a chosen one of the master cylinder and the power transmission unit to the selected one of the pair of front wheel brakes.

20 Claims, 6 Drawing Sheets

(51) Int. Cl.
B60T 8/17 (2006.01)
B60T 8/40 (2006.01)
B60T 8/48 (2006.01)
B60T 17/04 (2006.01)

(58) Field of Classification Search
CPC ...... B60T 8/368; B60T 8/4081; B60T 8/4872;
B60T 7/042; B60T 11/22; B60T 11/165;
B60T 13/58; B60T 13/147; B60T 13/165;
B60T 13/166; B60T 13/686; B60T
13/662; B60T 13/741; B60T 13/588;
B60T 13/745; B60T 13/746; B60T 15/36;
B60T 15/028; B60T 17/221; B60T 17/22;
B60T 17/043; B60T 2220/04; B60T
2270/10; B60T 2270/82; B60T 2270/402;
B60T 2270/404; B60T 2270/406
USPC ....................................................... 303/119.3
See application file for complete search history.

(56) References Cited

U.S. PATENT DOCUMENTS

| | | | |
|---|---|---|---|
| 9,988,022 B2 | 6/2018 | Mayr et al. | |
| 10,059,321 B2 | 8/2018 | Van Zanten et al. | |
| 10,150,459 B2 | 12/2018 | Weh et al. | |
| 10,308,232 B2 | 6/2019 | Mayr et al. | |
| 10,507,811 B2 | 12/2019 | Tandler et al. | |
| 10,730,501 B2 | 8/2020 | Ganzel | |
| 2007/0108836 A1 | 5/2007 | Feigel | |
| 2017/0021813 A1 | 1/2017 | Tandler et al. | |
| 2019/0225205 A1* | 7/2019 | Ganzel | B60T 13/745 |
| 2019/0248348 A1* | 8/2019 | Ganzel | B60T 13/745 |
| 2020/0298807 A1* | 9/2020 | Ganzel | B60T 13/146 |
| 2020/0307538 A1 | 10/2020 | Ganzel | |
| 2021/0053546 A1* | 2/2021 | Plewnia | B60T 13/745 |
| 2021/0261109 A1* | 8/2021 | Ganzel | B60T 7/042 |
| 2022/0274575 A1 | 9/2022 | Ganzel | |

* cited by examiner

HYDRAULIC BRAKE BOOST

RELATED APPLICATION

This application claims priority from U.S. Provisional Application No. 63/402,526, filed 31 Aug. 2022, the subject matter of which is incorporated herein by reference in its entirety.

TECHNICAL FIELD

This disclosure relates to an apparatus and method for use of a brake system and, more particularly, to a method and apparatus of a hydraulic brake system supplying hydraulic push-through to the front brakes only or boost to the front and rear brakes via the use of two-position three-way valves associated with each front brake.

BACKGROUND

A brake system may include anti-lock control including a pedal-operated hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include both anti-lock control and traction slip control, which can use braking pressure modulators for controlled vehicular braking.

Descriptions of prior art brake systems are in U.S. Pat. No. 10,730,501, issued 4 Aug. 2020 to Blaise Ganzel and titled "Vehicle Brake System with Auxiliary Pressure Source", in U.S. Patent Application Publication No. 2020/0307538, published 1 Oct. 2020 by Blaise Ganzel and titled "Brake System with Multiple Pressure Sources", and in U.S. Patent Application Publication No. 2022/0274575, published 1 Sep. 2021 by Blaise Ganzel and titled "Hydraulic Brake Boost", all of which are incorporated herein by reference in their entirety for all purposes.

SUMMARY

In an aspect, alone or in combination with any other aspect, a brake system for actuating a pair of front wheel brakes and a pair of rear wheel brakes is disclosed. The system includes a reservoir and a master cylinder operable during a manual push-through mode by actuation of a brake pedal connected to the master cylinder to generate brake actuating pressure at a first output for hydraulically actuating the pair of front wheel brakes. A power transmission unit is configured for selectively providing pressurized hydraulic fluid for actuating the pair of front wheel brakes and the pair of rear wheel brakes during a normal non-failure braking event. An electronic control unit is provided for controlling the power transmission unit. A pedal simulator is in selective fluid communication with the master cylinder for providing predetermined brake pedal response. First and second two-position three-way valves are provided. Each three-way valve is hydraulically connected with the master cylinder, the power transmission unit, and a selected one of the front wheel brakes. Each of the first and second three-way valves selectively controls hydraulic fluid flow from a chosen one of the master cylinder and the power transmission unit to the selected one of the pair of front wheel brakes.

In an aspect, alone or in combination with any other aspect, a brake system for actuating a pair of front wheel brakes and a pair of rear wheel brakes is described. The brake system includes a reservoir and a master cylinder operable during a manual push-through mode by actuation of a brake pedal connected to the master cylinder to generate brake actuating pressure at a first output for hydraulically actuating the pair of front wheel brakes. A power transmission unit is configured for selectively providing pressurized hydraulic fluid for actuating the pair of front wheel brakes and the pair of rear wheel brakes during a normal non-failure braking event. An electronic control unit is provided for controlling the power transmission unit. A pedal simulator is in selective fluid communication with the master cylinder for providing predetermined brake pedal response. First and second two-position three-way valves are provided. Each three-way valve is hydraulically connected with the master cylinder, the power transmission unit, and a selected one of the front wheel brakes. Each of the first and second three-way valves selectively controls hydraulic fluid flow from a chosen one of the master cylinder and the power transmission unit to the selected one of the pair of front wheel brakes. A hydraulic block is provided. The hydraulic block includes a master cylinder bore extending into the hydraulic block from a first block side and configured to selectively accept at least a portion of the master cylinder. A power transmission unit bore extends into the hydraulic block from a second block side, substantially perpendicular to the first block side, and is configured to selectively accept at least a portion of the power transmission unit. The power transmission unit bore protrudes from a main body of the hydraulic block at a third block side. The third block side is substantially perpendicular to the first block side and substantially parallel to the second block side. The third block side includes a power transmission unit housing cover selectively attached thereto for defining at least a portion of a hydraulic chamber of the power transmission unit. A plurality of valve ports extends into the hydraulic block from the second block side. At least a selected two of the valve ports are each configured to selectively accept at least a portion of a selected one of the first and second two-position three-way valves. The selected two of the valve ports are located further from the first block side than is the power transmission unit bore. The power transmission unit bore extends into the hydraulic block substantially perpendicular to, and spaced apart from, the master cylinder bore.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
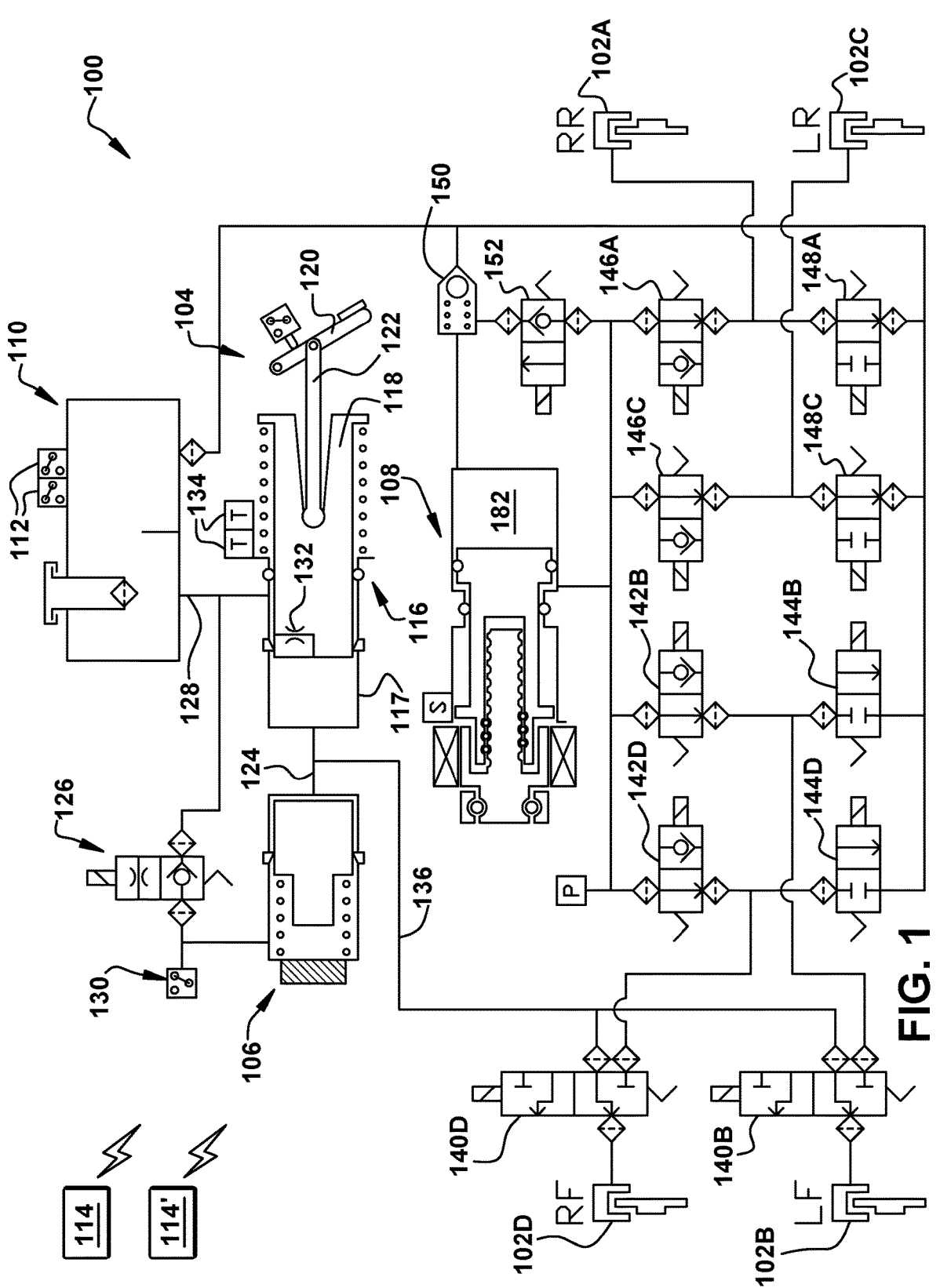
FIG. 1 is a schematic hydraulic diagram of a brake system according to an aspect of the present invention, in a first configuration.

FIG. 1 depicts a brake system 100 for actuating a pair of front wheel brakes and a pair of rear wheel brakes, in a first configuration. The brake system 100 is shown here as a hydraulic boost braking system in which boosted fluid pressure is utilized to apply braking forces for the brake system 100. The brake system 100 may suitably be used on a ground vehicle, such as an automotive vehicle having four wheels with a wheel brake associated with each wheel. Furthermore, the brake system 100 can be provided with other braking functions such as anti-lock braking (ABS) and other slip control features to effectively brake the vehicle. Components of the brake system 100 may be housed in one or more blocks or housings, as will be discussed in further detail with reference to FIGS. 5-6. The block or housing may be made from solid material, such as aluminum, that has been drilled, machined, or otherwise formed to house the various components. Fluid conduits may also be formed in the block or housing.

In the illustrated embodiment of the brake system 100, there are four wheel brakes 102A, 1028, 102C, and 102D. The wheel brakes 102A, 1028, 102C, and 102D can have any suitable wheel brake structure operated electrically and/or by the application of pressurized brake fluid. Each of the wheel brakes 102A, 1028, 102C, and 102D may include, for example, a brake caliper mounted on the vehicle to engage a frictional element (such as a brake disc) that rotates with a vehicle wheel to effect braking of the associated vehicle wheel. The wheel brakes 102A, 1028, 102C, and 102D can be associated with any combination of front and rear wheels of the vehicle in which the brake system 100 is installed.

In this example, the wheel brake 102A may be associated with a right rear wheel of the vehicle in which the brake system 100 is installed, and the wheel brake 1028 may be associated with the left front wheel. The wheel brake 102C may be associated with the left rear wheel, and the wheel brake 102D may be associated with the right front wheel.

The brake system 100 generally includes a brake pedal unit, indicated generally at 104, a pedal simulator, indicated generally at 106, a power transmission unit (also known as a dual-acting plunger or a plunger assembly in some configurations), indicated generally at 108, and a fluid reservoir 110. The reservoir 110 stores and holds hydraulic fluid for the brake system 100. The fluid within the reservoir 110 is preferably held at or about atmospheric pressure, but the fluid may be stored at other pressures if desired. The reservoir 110 is shown schematically having two tanks or sections with fluid conduit lines connected thereto. The sections can be separated by several interior walls within the reservoir 110 and are provided to prevent complete drainage of the reservoir 110 in case one of the sections is depleted due to a leakage via one of the two lines connected to the reservoir 110. Alternatively, the reservoir 110 may include multiple separate housings. The reservoir 110 may include at least one fluid level sensor 112 for detecting the fluid level of one or more of the sections of the reservoir 110.

The power transmission unit 108 of the brake system 100 functions as a source of pressure to selectively provide pressurized fluid for hydraulically actuating the pair of front wheel brakes and the pair of rear wheel brakes 102 during a typical or normal non-failure ("boost") brake apply. After a brake apply, fluid from the hydraulically operated wheel brakes 102A, 1028, 102C, and 102D may be returned to the power transmission unit 108 and/or diverted to the reservoir 110. In the depicted embodiment, the power transmission unit 108 is a dual acting plunger assembly. It is also contemplated that other configurations (not shown) of the brake system 100 could include hydraulic control of just the rear wheel brakes or just the front wheel brakes (the others of which would then be electrically controlled/actuated). One of ordinary skill in the art would be readily able to provide such an arrangement for a desired use environment, following aspects of the present invention.

The brake system 100 also includes at least one electronic control unit ("ECU") 114 for controlling at least the power transmission unit 108. The ECU 114 may include microprocessors and other electrical circuitry. The ECU 114 receives various signals, processes signals, and controls the operation of various electrical components of the brake system 100 in response to the received signals. The ECU 114 can be connected to various sensors such as the reservoir fluid level sensor 112, pressure sensors, travel sensors, switches, wheel speed sensors, and steering angle sensors. The ECU 114 may also be connected to an external module (not shown) for receiving information related to yaw rate, lateral acceleration, longitudinal acceleration of the vehicle, or other characteristics of vehicle operation for any reason, such as, but not limited to, controlling the brake system 100 during vehicle braking, stability operation, or other modes of operation. Additionally, the ECU 114 may be connected to the instrument cluster for collecting and supplying information related to warning indicators such as an ABS warning light, a brake fluid level warning light, and a traction control/vehicle stability control indicator light.

As shown schematically in FIG. 1, the brake pedal unit 104 includes a master cylinder 116 with a housing 117 for slidably receiving various cylindrical pistons and other components therein. The housing 117 may be a single unit or include two or more separately formed portions coupled together. A primary piston 118 is connected with a brake pedal 120 via a linkage arm 122. Leftward movement of the primary piston 118 may cause, under certain conditions, a pressure increase within the master cylinder 116. In the brake system 100, the master cylinder 116 is a fairly simple and inexpensive mechanical master cylinder unit.

The pedal simulator 106 is in selective fluid communication with the master cylinder 116 for providing predetermined brake pedal response. As shown, the pedal simulator 106 is connected to the master cylinder 116 via one or more hydraulic passages, but it is contemplated that the "selective fluid communication" could be provided via integration of the pedal simulator 106 into the master cylinder 116.

More specifically, the master cylinder 116 is in fluid communication with the pedal simulator 106 via a master cylinder passage 124. The primary piston 118 is slidably disposed in the bore of the housing 117 of the master cylinder 116. When the brake pedal unit 104 is in its rest position (the driver is not depressing the brake pedal 120), the structures of the master cylinder 116 permit fluid communication between the bore of the housing 117 and the reservoir 110 via a reservoir conduit 128. The pedal simulator 106 is therefore in selective fluid communication with the master cylinder 116 for providing predetermined brake pedal 120 response to the driver (e.g., brake pedal "feel").

The brake system 100 may further include an optional solenoid actuated pedal simulator valve 126 which may be electronically controlled between an open position and a powered closed position, and which is located fluidly between the reservoir 110 and the master cylinder 116. The pedal simulator valve 126 can be controlled during various testing modes to determine the correct operation of other components of the brake system 100. For example, the pedal simulator valve 126 may be actuated to an open position to determine whether leaks may be occurring through seals of various components of the brake system 100 (e.g. a piston seal of the pedal simulator 106). The pedal simulator valve 126 itself can be tested for leaks when de-energized (e.g., through feedback from other components of the brake system 100).

A pressure switch 130 may be provided to facilitate leak detection in the pedal simulator valve 126 and is, like the pedal simulator valve 126, located fluidically between the reservoir 110 and the master cylinder 116. The pressure switch 130 selectively provides a sensor signal to the electronic control unit 114. The sensor signal is indicative of an operational condition of the pedal simulator valve 126, such as whether the pedal simulator valve 126 is working normally, is blocked, fails to open, or has any other operational condition which can be communicated to the ECU 114. The pressure switch 130 also allows detection of a blockage or nonfunctional state of the pedal simulator valve 126; if the pedal simulator valve 126 is found not to be working, other components of the brake system 100 could be used to place the system into a manual push-through, backup mode of operation. Additionally, and as shown schematically in FIG. 1, a cutoff port 132 can be provided to a fixed-seal type master cylinder 116, with an orifice that can detect a large/gross leak in the pedal simulator valve 126.

It is contemplated that the brake system 100 could include at least two hydraulically operated wheel brakes 102A, 1028, 102C, and 102D. For example, the two front wheel brakes 1028 and 102D, the two front wheel brakes 102A and 102C, or either front wheel brake 1028 or 102D and one rear wheel brake 102A or 102C, could constitute a "pair" of hydraulically operated wheel brakes 102A, 1028, 102C, and 102D. In the below description of FIG. 1, all four of the wheel brakes are used as an example, though one of ordinary skill in the art will be able to provide a suitable brake system 100 according to aspects of the present invention for any combination of two or more hydraulically-operated wheel brakes 102A, 102B, 102C, and 102D.

The brake pedal unit 104 is connected to the brake pedal 120 and is actuated by the driver of the vehicle as the driver presses on the brake pedal 120. A brake travel sensor or switch 134 may be electrically connected to the ECU 114 to provide a signal indicating a depression of the brake pedal 120. The brake pedal unit 104 may be used as a back-up source of pressurized fluid to essentially replace the normally supplied source of pressurized fluid from the power transmission unit 108 under certain failed conditions of the brake system 100, and/or upon initial startup of the brake system 100. This situation is referred to as a manual push-through event, or a "manual apply".

The brake pedal unit 104 can supply pressurized fluid to a master cylinder output 136, which is then routed to selected wheel brakes 102 as desired. This flow is pushed through, largely under mechanical pressure upon the brake pedal 120 from the driver's foot, from the master cylinder

116. That is, the master cylinder 116 is operable during a manual push-through mode by actuation of the brake pedal 120 connected to the master cylinder 116 to generate brake actuating pressure at a first output (here, schematically shown as master cylinder output 136) for hydraulically actuating at least one of the hydraulically-actuated brakes (here, the pair of front wheel brakes 1028, 102D).

As shown in the Figures, a pair of rear brake motors 138 may be provided for selectively electrically actuating respective rear wheel brakes 102A and 102C. Therefore, except as noted otherwise or obvious from context, the pair of front wheel brakes 1028 and 102D are presumed herein to be hydraulically powered, and the pair of rear wheel brakes 102A and 102C are presumed herein to be electrically powered, though it is contemplated that the wheel brakes 102A, 1028, 102C, and 102D could each be powered electrically and/or hydraulically—for example, the front wheel brakes 1028 and 102D could be electrically powered and the rear wheel brakes 102A and 102C could be hydraulically powered, and/or at least one of the wheel brakes 102A, 1028, 102C, and 102D could be powered electrically during certain phases of operation and hydraulically during other phases of operation, of the same brake system 100. It is also contemplated that one or more hydraulically and/or electrically powered parking brakes (not shown) could be provided to any of the wheels of the vehicle, as desired. Additionally, it is contemplated that a braking signal could be generated electronically by the brake pedal unit 104 via, for example, one or more travel sensors 134 and transmitted, in any suitable manner, to other portions of the brake system 100.

The power transmission unit 108 is configured for selectively providing pressurized hydraulic fluid for actuating the pair of front wheel brakes 1028 and 102D and the pair of rear wheel brakes 102A and 102C during a braking event (e.g., a normal, non-failure braking event). The electronic control unit 114 controls the power transmission unit 108.

First and second two-position three-way valves 1408, 140D are each hydraulically connected with the master cylinder 116, the power transmission unit 108 and with a selected one of the front wheel brakes 1028 and 102D. Each of the three-way valves 140B, 140D selectively controls hydraulic fluid flow from a chosen one of the master cylinder 116 and the power transmission unit 108 to the corresponding, selected one of the front wheel brakes 1028 and 102D. Through use of the three-way valves 1408, 140D, hydraulic fluid can be routed to the front wheel brakes 1028 and 102D in a desired manner (from either the master cylinder 116 or the power transmission unit 108) to assist with boosted braking control and provide desired response times and efficient pressure flow to the front wheel brakes 1028 and 102D.

It is contemplated that at least the three-way valves 140B, 140D, the pedal simulator 106, and the power transmission unit 108, along with their related sensors, hydraulic lines, valves, and the like, may be located remotely from the reservoir 112, the master cylinder 116, and wheel brakes 102. The term "located remotely" is used herein to indicate spacing significantly apart and outside any common housing.

An iso/dump control valve arrangement is associated with each wheel brake 1028, 102D of the pair of front wheel brakes. Each iso/dump control valve arrangement includes an iso valve 142 and a dump valve 144, for providing desired fluid routing to an associated wheel brake 102. Here, for clarity in some Figures, the iso and dump valves 142 and 144 are appended with the letter "B" or "D", referencing a respective front wheel brake 102B and 102D, with which the so-labeled valves are respectively associated, a convention that will be carried through in other contexts in this application.

The normally open iso valve 142 for each iso/dump control valve arrangement is located hydraulically between a respective wheel brake 102 and the power transmission unit 108, and the normally closed dump valve 144 for each iso/dump control valve arrangement is located hydraulically between a respective wheel brake 102 and the reservoir 110, for the corresponding wheel brake 102. More specifically, the iso/dump control valve arrangement for each wheel brake 102B, 102D of the pair of front wheel brakes is hydraulically interposed between the power transmission unit 108 and a corresponding three-way valve 140B, 140D. As a result, the three-way valve 140B, 140D can "decide" whether to route hydraulic fluid to the corresponding front wheel brake 102B, 102D from the power transmission unit 108 via the iso/dump control valve arrangement (in a normal, non-failure braking mode) or from the master cylinder 116 (in a backup braking mode). Another feature provided to the brake system 100 by the depicted arrangement is the ability of the iso valves 142 to be actuated to prevent fluid from running freely out of the system if there is a leakage at the corresponding wheel brake 102. It should be noted that the normally closed seat of the three-way valves 140B, 140D prevent fluid from leaking out when there is no braking. The iso valve 142 on a leaking brake 102 may be energized to prevent hydraulic fluid from leaking out when braking is occurring because the normally closed seat of the corresponding three-way valve 140B or 140D can only resist low pressure.

The iso/dump control valve arrangements may selectively provide slip control to at least one wheel brake 102 when powered by the power transmission unit 108. More broadly, the iso/dump control valve arrangement, and/or other valves of the brake system 100, any of which may be solenoid-operated and have any suitable configurations, can be used to help provide controlled braking operations, such as, but not limited to, ABS, traction control, vehicle stability control, dynamic rear proportioning, regenerative braking blending, and autonomous braking.

Again as shown in FIG. 1, normal braking control of each of the pair of rear wheel brakes 102A, 102C may be provided by an arrangement of first and second rear iso valves 146, 148 hydraulically interposed between the power transmission unit 108 and a corresponding rear wheel brake 102A, 102C. As previously mentioned, the first and second rear iso valves 146 and 148 are appended with the letter "A" or "C", referencing a respective rear wheel brake 102A and 102C, with which the so-labeled valves are respectively associated.

The normally open first iso valve 146 for each rear wheel brake 102 is located hydraulically between the respective wheel brake 102 and the power transmission unit 108, and the normally open second iso valve 148 for each rear wheel brake 102 is located hydraulically between a respective wheel brake 102 and the reservoir 110, for the corresponding wheel brake 102. (It should be noted that the second iso valve 148 for each rear wheel brake 102 is energized closed during a boosted brake apply.) The first and second rear iso valves 146 and 148 may be substantially similar in configuration to each other, and may be used to provide controlled braking operations, such as, but not limited to, ABS, traction control, vehicle stability control, dynamic rear proportioning, regenerative braking blending, and autonomous braking.

As is shown in the Figures, the rear wheel brakes 102A, 102C are not associated with any two-position three-way valves. As a result, if the power transmission unit 108 is unable to provide pressurized hydraulic fluid for some reason, the rear wheel brakes 102A, 102C will not be available for braking the vehicle in such a backup/failure situation. However, the front wheel brakes 102B, 102D will still be functional in a backup braking ("push through") mode via the master cylinder 116, as previously mentioned. Additionally, it is contemplated that an electric parking or service brake and motor (shown schematically at 138) could be provided to one or both rear wheel brakes 102A, 102C if desired, for additional redundancy.

FIG. 1 also depicts a replenishing check valve 150, which is located fluidically between the reservoir 110 and the power transmission unit 108. When present, the replenishing check valve 150 may be provided to assist with refilling of the power transmission unit 108 (or components thereof) under predetermined conditions. For example, the replenishing check valve 150 may help to facilitate refilling of the chamber in front of the DAP head when a DAP-type power transmission unit 184 is building pressure during its retraction stroke by pushing fluid out of the annular chamber behind the DAP head. This may be done, for example, during slip control if additional flow to the brakes is needed after the DAP is stroked fully forward.

A normally closed dual-acting plunger ("DAP") valve 152 may be interposed hydraulically between the power transmission unit 108 and at least one of the iso/dump valve arrangements (for at least one of the front wheel brakes 1028, 102D) and/or the first/second rear iso valves 146/148 (for at least one of the rear wheel brakes 102A, 102C). When present, the normally closed DAP valve 152 (which is usually energized open) may assist the power transmission unit 109 in acting like a single acting plunger type power transmission unit when the DAP valve 152 is open. The DAP valve 152 can be closed to invoke the "pumping action" rearward travel of the dual-acting plunger type power transmission unit 108, in a known manner. If the normally closed DAP valve 152 fails—in the circuit shown in FIG. 1—the rear wheel brakes 102A, 102C may become unavailable under certain use conditions (e.g., an external leakage), but the driver will still be able to utilize the brakes 102 in the manual push-through mode, via the master cylinder 116 and the respective three-way valves 140B, 140D. (If the normally closed DAP valve 152 develops an internal leakage, the brakes 102 will still likely be able to be used in normal, non-failure "boost" mode.)

The electronic control module 114 may be a first electronic control module 114. The brake system 100 shown in FIG. 1 also may include a second electronic control module 114', which may be the same as, or different than, the first electronic control module 114. This arrangement may be useful, for example, for providing redundancy in the brake system, and/or for facilitating autonomous braking. A chosen one of the first and second electronic control modules 114 and 114' may control the power transmission unit 108, and the other one of the first and second electronic control modules 114 and 114' may control the first and second three-way valves 140B and 140D. Optionally, the iso/dump valve arrangements, the pedal simulator valve and/or any other desired sensors, valves, or other components of the brake system 100 could be controlled by the second electronic control module 114'.

In the brake system 100 shown in FIG. 1, the components may be physically arranged in the housing 117 such that the ECU 114 is substantially insulated from damage and shortcircuiting due to leaking hydraulic fluid in other portions of the system. The redundancy of the brake system 100 in general also may afford some protection from complete failure even if the ECU 114 is damaged. For example, the pressure switch 130 and pedal simulator valve 126 could leak into the ECU 114, but manual push-through would still be maintained as an option, albeit with some lost travel in the master cylinder 116.

As another example, there is no direct leak path from the master cylinder 116 and manual push-through (backup mode) parts of the system through the two-position three-way valves 140 into the ECU 114. If the power transmission unit 108 and normal non-failure mode parts of the system leak via the two-position three-way valves 140 into the ECU 114, the backup mode is still possible through use of the master cylinder 116 push-through. It may be important, though, in some use environments to avoid physical ejection of the two-position three-way valves 140 and separation of those three-way valves 140 from the housing 117.

Figure 2:
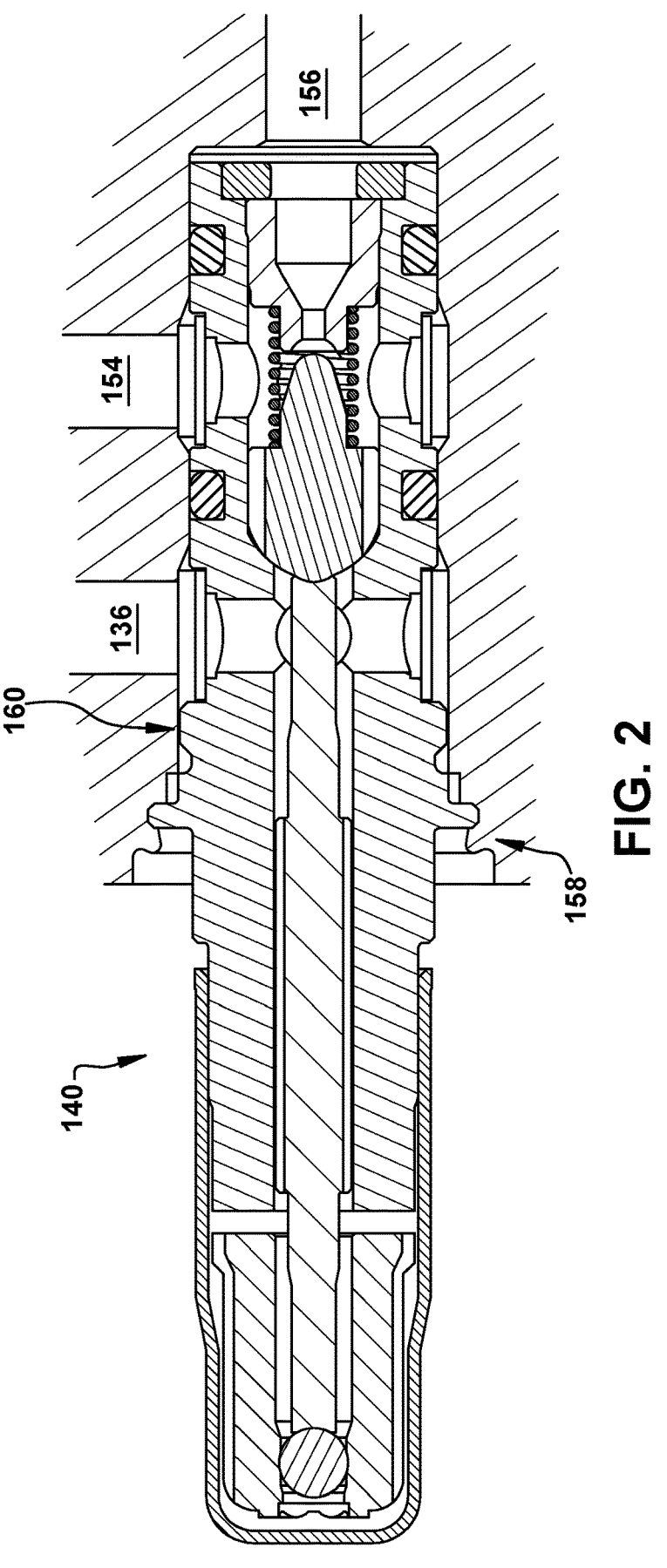
FIG. 2 is a schematic partial side view of a first component suitable for use in a brake system according to any aspect of the present invention.
Figure 5:
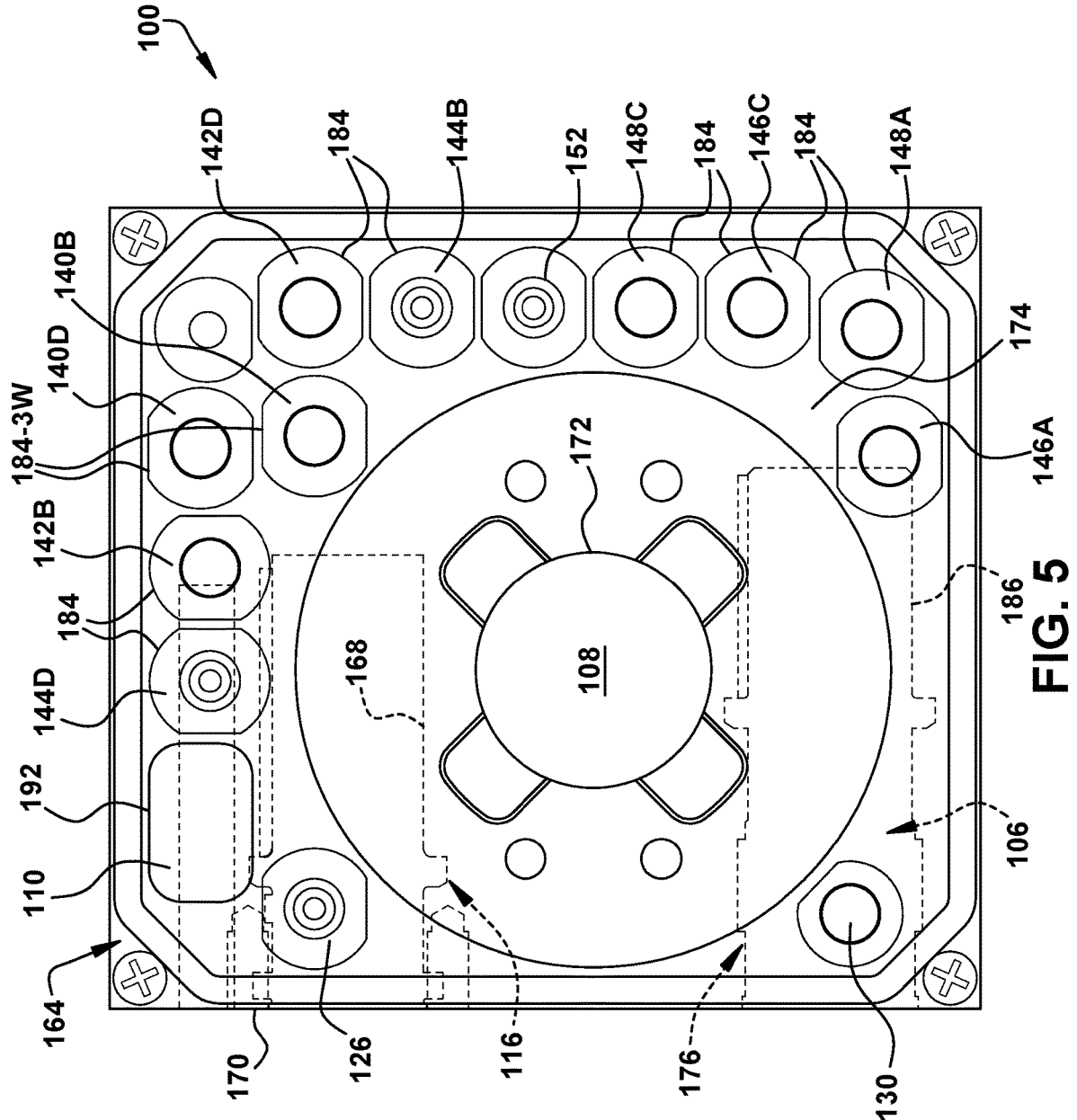
FIG. 5 is a schematic side view of the brake system of FIG. 1.
Figure 6:
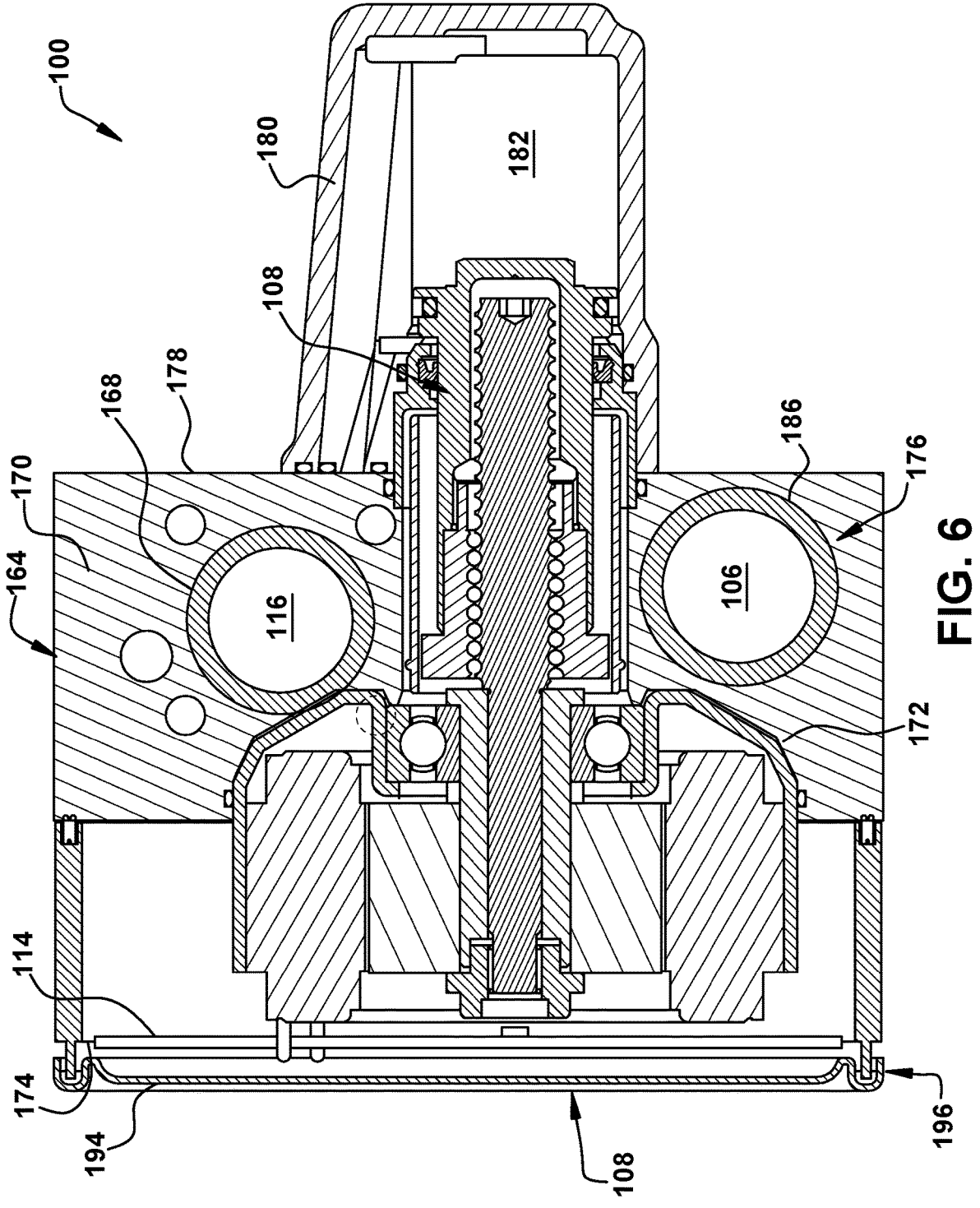
FIG. 6 is a schematic front view of the brake system of FIG. 1.

While the physical arrangement of brake system 100 components will be further discussed with reference to FIGS. 5-6, FIG. 2 schematically depicts an example two-position three-way valve 140. The MC output channel is shown entering the three-way valve at 156, fluid communication with the corresponding iso/dump valve arrangement is shown via normal non-failure channel 136, and wheel brake channel 154 represents a link to the corresponding wheel brake 102.

At least one of the first and second three-way valves 140 may be mechanically retained in operative connection to a corresponding front wheel brake 102A, 102C using both primary and secondary retention means. As shown in FIG. 2, the three-way valve 140 may be maintained in the housing 117 via both a stake joint 158 and a clinch joint 160. It is contemplated, though, that the three-way valve(s) 140, or any other components of the brake system 100 may be connected to the housing 117 or to each other in any desired manner, such as, but not limited to, welding, adhesives, frictional fit, interference fit, at least one fastener, or any combination thereof. In the FIG. 2 arrangement, both of the stake joint 158 and the clinch joint 160 are contemplated as being capable of independently retaining the three-way valve 140 in place in the housing 117 under normal circumstances, so both would need to fail for an undesirable ejection of the three-way valve 140 to occur.

With reference to FIG. 1, the schematically depicted brake system 100 is configured to facilitate particular types of diagnostic testing. For example, the pressure switch 130 could be activated through use of the DAP-type power transmission unit 108 to push hydraulic fluid back to the reservoir 110 through the fixed-seal port orifice 132, although this will only detect leakage of the pedal simulator valve 126 above a predetermined leakage level. For example, leakage of the pedal simulator valve 126 of more than about 2-3 cc's of fluid per minute could be detected in this manner. As another option, the ECU 114 could control the brake system 100 during the first brake apply (e.g., upon startup) to use manual push-through on the front wheel brakes 102B, 102D and DAP-powered (normal non-failure) braking from the power transmission unit 108 on the rear wheel brakes 102A, 102C. However, some drivers may be disconcerted by the pedal feel and clicking noise of the dump valves 144B, 144D (used to test sealing of the normally closed seats of the corresponding three-way valves 140B, 140D). This second option, however, may make it easier to detect "slow" leakage of the pedal simulator valve 126, below the predetermined leakage level.

Figure 3:
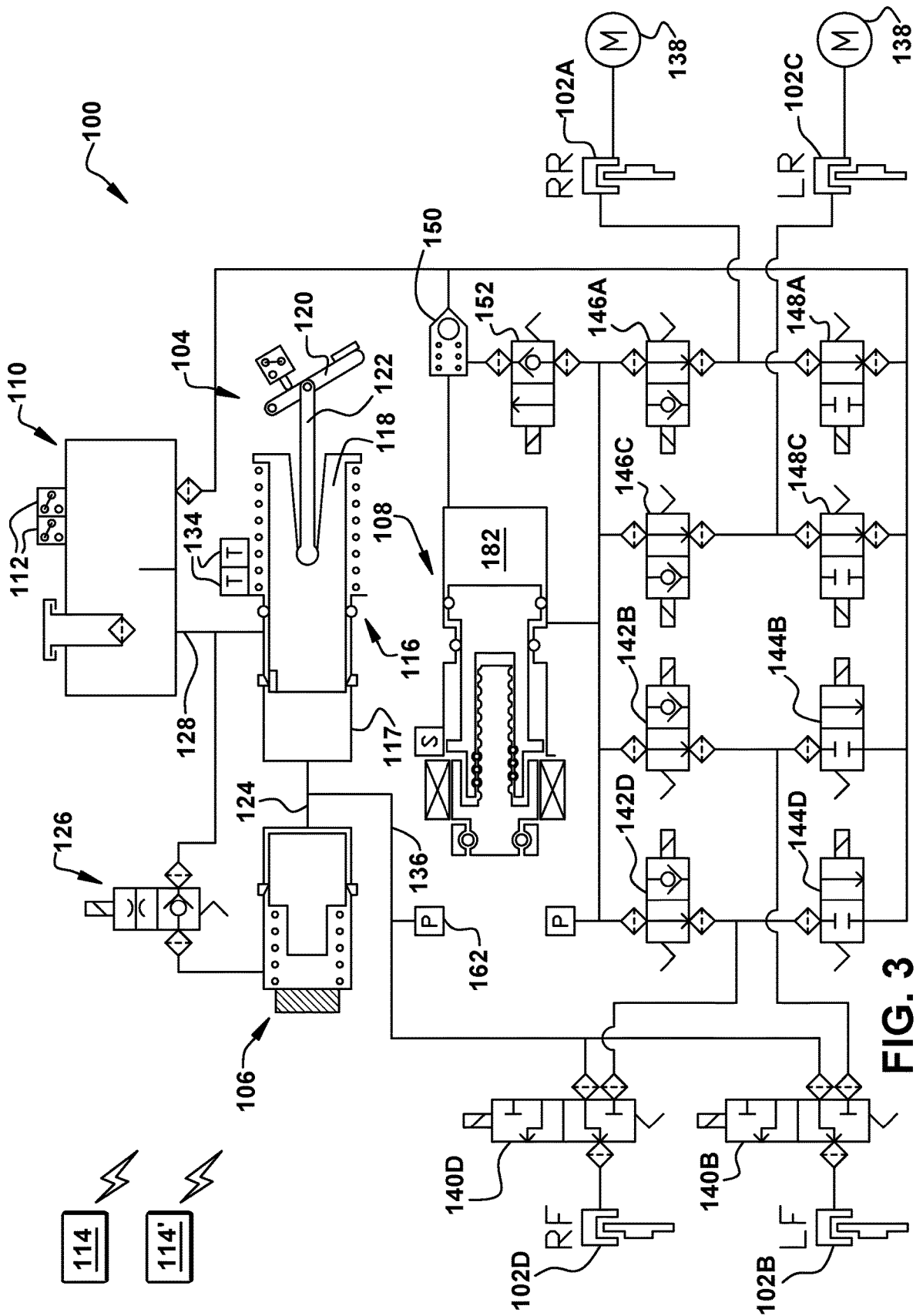
FIG. 3 is a schematic hydraulic diagram of the brake system of FIG. 1, in a second configuration.

Turning now to FIG. 3, a second configuration of the brake system 100 is depicted, parts or all of which can be used with other components of the present invention, as desired. Description of similar components and operation which is made elsewhere in this application will not necessarily be repeated for each and every described configuration or aspect of the brake system 100, for brevity, but should instead be considered to apply to like-numbered portions of other configurations as appropriate.

In the arrangement of the brake system 100 shown in FIG. 3, the pressure switch 130 is omitted. (The pressure switch 130 is a binary "limit sensing" mechanism which communicates on/off type information regarding brake pedal 120 travel to the ECU 114.) Instead, in the brake system 100 of FIG. 3, a pressure sensor 162 is located fluidically between the three-way valve(s) 140 and the pedal simulator 106 along the MC passage 136. The pressure sensor 162 selectively provides a sensor signal to the ECU 114. The sensor signal is indicative of movement of the brake pedal 120 responsive to a driver input, but includes more information than the simple on/off communication of the pressure switch 130. The sensor signal of the pressure sensor 162 is able to provide the ECU 114 with an indication of the speed and pressure with which the driver is pressing the brake pedal 120 (i.e., the "driver applied pedal force"). This additional information may be helpful to the brake system 100 by providing further data regarding the driver's intent near, or at the end of, brake pedal 120 travel, when the force v. travel curve is very steep/stiff.

Figure 4:
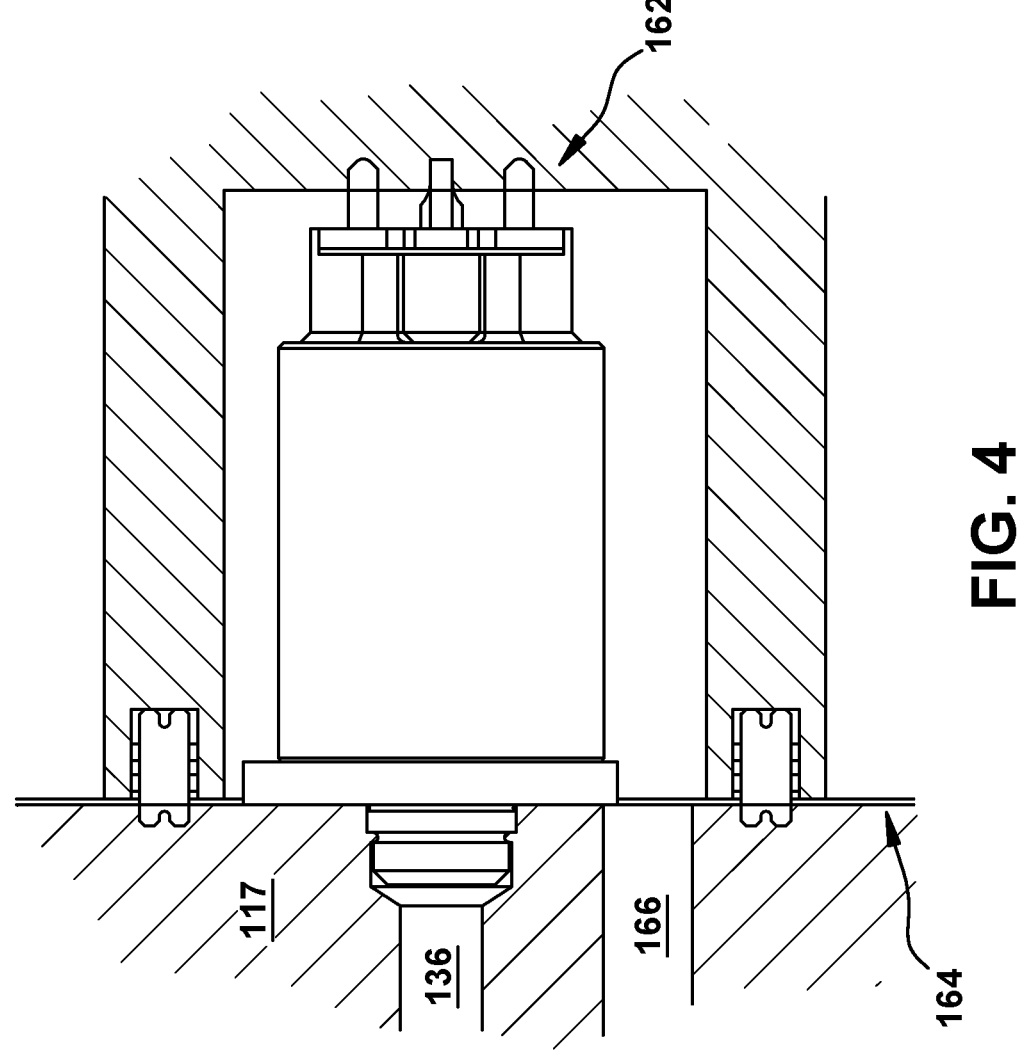
FIG. 4 is a schematic partial side view of a second component suitable for use in a brake system according to any aspect of the present invention.

However, in the brake system 100 shown in FIG. 3, there is a risk that the pressure sensor 162 may leak in such a way to disable both the ECU 114 and the ability of the brake system 100 to operate in the manual push-through backup mode. To mitigate this risk, the pressure sensor 162 may be configured as shown in FIG. 4. That is, both the pressure sensor 162 and ECU 114 may be substantially enclosed in a hydraulic block 164, which may be partially or entirely comprised of housing 117. The pressure sensor 162 is vented to an outside atmosphere along a sensor vent path 166 that is fluidically separated from the ECU 114 by at least a portion of the hydraulic block 164. More specifically, a small sealed air chamber inside the ECU 140 protects the rest of the ECU 140 from brake fluid. Venting of that small air chamber may help prevent very high pressure from still causing leakage into the "protected" part of the ECU 144. The air cavity inside the power transmission unit 108 where the ball nut and spindle reside is also vented, similarly, in case the dual-acting plunger rod seal leaks; the ball bearing of the power transmission unit 108 can't seal high pressure, in some configurations.

FIGS. 5-6 are side and front views, respectively, of a hydraulic block 164 configured to efficiently package the components of the brake system 100 of FIG. 1 into a compact space having a predetermined envelope shape. The hydraulic block 164 includes a master cylinder bore 168 extending into the hydraulic block 164 from a first block side 170 and configured to selectively accept at least a portion of the master cylinder 116. (A "bore" here is used to indicate a cavity or lumen formed in the hydraulic block 164 in any suitable manner, including, but not limited to, molding and machining.)

A power transmission unit bore 172 extends into the hydraulic block 164 from a second block side 174. The second block side is substantially perpendicular to the first block side 170. The power transmission unit bore 172 is configured to selectively accept at least a portion of the power transmission unit 108. As shown in FIG. 6, the power transmission unit bore 172 protrudes from a main body 176 of the hydraulic block at a third block side 178. The third block side 178 is substantially perpendicular to the first block side 170 and is substantially parallel to the second block side 174. The first, second, and third block sides 170, 174, and 178 may all be substantially planar. The third block side 178 includes a power transmission unit housing cover 180 selectively attached thereto for defining at least a portion of a hydraulic chamber 182 of the power transmission unit 108. For example, the power transmission unit housing cover 180 can be bolted to an aperture on the third block side 178 to cover the power transmission unit 108 when the power transmission unit 108 protrudes from the third block side 178. The power transmission unit bore 172 extends into the hydraulic block 164 in a position that is substantially perpendicular to, and spaced apart from, the master cylinder bore 168, as can be seen with reference to the orthogonal views of FIGS. 5-6.

A plurality of valve ports 184 extend into the hydraulic block 164 from the second block side 174 (in plan view in FIG. 5). At least a selected two of the valve ports (labeled in FIG. 5 as 184-3W) are each configured to selectively accept at least a portion of a selected one of the first and second two-position three-way valves 140B, 140D. The selected two of the valve ports 184-3W are located further away from the first block side 170 than is at least a portion of the power transmission unit bore 172. (E.g., as shown in the orientation of FIG. 5, the selected two of the valve ports 184-3W are located more to the right side of the hydraulic block 164 than is most of the power transmission unit bore 172.)

A pedal simulator bore 186 extends into the hydraulic block from the first block side 170 and is configured to selectively accept the pedal simulator 106. As is shown schematically in FIG. 5, the pedal simulator bore 186 extends substantially parallel to the master cylinder bore. The power transmission unit bore 172 is at least partially interposed between the pedal simulator bore 186 and the master cylinder bore 168. (E.g., at least a portion of the power transmission unit bore 172 is vertically between the pedal simulator bore 168 and the master cylinder bore 168, in the orientation of FIGS. 5-6.)

A plurality of brake ports are defined in the third block side 178. Each brake port corresponds to a selected one of front and rear brakes 120. A pedal travel sensor bore 192 extends into the hydraulic block 164 from the second block side 174. The pedal travel sensor 192 is configured to selectively accept at least a portion of the brake pedal travel sensor 134.

The electronic control unit ("ECU") 114 is associated with (e.g., located on) the second block side 174, adjacent the power transmission unit bore 172, as shown in FIG. 6. An ECU cover 194 is attached to the second block side 174 with the ECU 114 interposed between the ECU cover 194 and the second block side 174. For example, and as shown in FIG. 6, the ECU cover 194 could be attached to the second block side 174 via ECU interface rim 196. The ECU interface rim 196 could comprise at least one of an adhesive, one or more fasteners, a weld, an interference/frictional fit, or any other mechanism suitable to maintain the ECU cover 194 in place as shown. The ECU cover 194 substantially encloses the electronic control unit 114 and at least a portion of the hydraulic block 164. Accordingly, the ECU cover 194 can protect the ECU 114 from damage caused by leakage of other components of the brake system 100.

The brake system 100 depicted in the Figures and shown herein is robust and resists failure. In order for the brake system 100 to be unable to provide brake operation using one of (1) manual push-through mode with pressurized hydraulic fluid from the master cylinder, and (2) normal non-failure braking mode with pressurized hydraulic fluid from the power transmission unit, then more than one structure or component of the brake system 100 must be at least partially in a failure mode (temporary or permanent) at the same time. That is, concurrent disabling of both of these two brake modes only occurs responsive to failure of two or more components of the brake system (the components being the elements shown in the Figures and/or described herein).

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A brake system for actuating a pair of front wheel brakes and a pair of rear wheel brakes, the system comprising:

a reservoir;

a master cylinder operable during a manual push-through mode by actuation of a brake pedal connected to the master cylinder to generate brake actuating pressure at a first output for hydraulically actuating the pair of front wheel brakes;

a power transmission unit configured for selectively providing pressurized hydraulic fluid for actuating the pair of front wheel brakes and the pair of rear wheel brakes during a normal non-failure braking event;

an electronic control unit for controlling the power transmission unit;

a pedal simulator in selective fluid communication with the master cylinder for providing predetermined brake pedal response;

first and second two-position three-way valves, each three-way valve being hydraulically connected with the master cylinder, the power transmission unit, and only a selected one of the front wheel brakes;

each of the first and second three-way valves selectively controlling hydraulic fluid flow from a chosen one of the master cylinder and the power transmission unit to the selected one of the pair of front wheel brakes, and an iso/dump control valve arrangement hydraulically interposed between the power transmission unit and a corresponding front wheel brake, each of the first and second three-way valves being hydraulically interposed between the iso/dump control valve arrangement and the corresponding front wheel brake.

2. The brake system of claim 1, wherein normal braking control of each of the pair of rear wheel brakes is provided by an arrangement of first and second rear iso valves hydraulically interposed between the power transmission unit and a corresponding rear wheel brake.

3. The brake system of claim 2, wherein the first and second rear iso valves are substantially similar in configuration to each other.

4. The brake system of claim 1, wherein normal braking control of each of the pair of front wheel brakes is provided by the iso/dump control valve arrangement hydraulically interposed between the power transmission unit and a corresponding front wheel brake.

5. The brake system of claim 1, wherein the electronic control module is a first electronic control module, the brake system including a second electronic control module, wherein a chosen one of the first and second electronic control modules controls the power transmission unit, and the other one of the first and second electronic control modules controls the first and second three-way valves.

6. The brake system of claim 1, wherein at least one of the first and second three-way valves is mechanically retained in operative connection to a corresponding front wheel brake using both primary and secondary retention means.

7. The brake system of claim 1, including a pedal simulator valve and a pressure switch, both being interposed fluidically between the pedal simulator and the reservoir, the pressure switch selectively providing a switch signal to the electronic control unit, the switch signal being indicative of an operational condition of the pedal simulator valve.

8. The brake system of claim 1, including a pressure sensor located fluidically between the three-way valve and the pedal simulator, the pressure sensor selectively providing a sensor signal to the electronic control unit, the sensor signal being indicative of driver applied pedal force.

9. The brake system of claim 8, wherein at least the pressure sensor and electronic control unit are substantially enclosed in a hydraulic block, the pressure sensor being vented to an outside atmosphere along a sensor vent path that is fluidically separated from the electronic control unit by at least a portion of the hydraulic block.

10. The brake system of claim 1, wherein the power transmission unit is a dual-acting plunger type power transmission unit.

11. The brake system of claim 1, wherein concurrent disabling of (1) manual push-through mode with pressurized hydraulic fluid from the master cylinder, and (2) normal non-failure braking mode with pressurized hydraulic fluid from the power transmission unit is achieved responsive to failure of two or more components of the brake system.

12. A brake system for actuating a pair of front wheel brakes and a pair of rear wheel brakes, the system comprising:

a reservoir;

a master cylinder operable during a manual push-through mode by actuation of a brake pedal connected to the master cylinder to generate brake actuating pressure at a first output for hydraulically actuating the pair of front wheel brakes;

a power transmission unit configured for selectively providing pressurized hydraulic fluid for actuating the pair of front wheel brakes and the pair of rear wheel brakes during a normal non-failure braking event;

an electronic control unit for controlling the power transmission unit;

a pedal simulator in selective fluid communication with the master cylinder for providing predetermined brake pedal response;

first and second two-position three-way valves, each three-way valve being hydraulically connected with the master cylinder, the power transmission unit, and a selected one of the front wheel brakes, and each of the first and second three-way valves selectively controlling hydraulic fluid flow from a chosen one of the master cylinder and the power transmission unit to the selected one of the pair of front wheel brakes; and a hydraulic block, the hydraulic block including a master cylinder bore extending into the hydraulic block from a first block side and configured to selectively accept at least a portion of the master cylinder, a power transmission unit bore extending into the hydraulic block from a second block side, substantially perpendicular to the first block side, and being configured to selectively accept at least a portion of the power transmission unit, the power transmission unit bore protruding from a main body of the hydraulic block at a third block side, the third block side being substantially perpendicular to the first block side and substantially parallel to the second block side, the third block side including a power transmission unit housing cover selectively attached thereto for defining at least a portion of a hydraulic chamber of the power transmission unit, and a plurality of valve ports extending into the hydraulic block from the second block side, at least a selected two of the valve ports being each configured to selectively accept at least a portion of a selected one of the first and second two-position three-way valves, the selected two of the valve ports being located further from the first block side than is the power transmission unit bore;

wherein the power transmission unit bore extends into the hydraulic block substantially perpendicular to, and spaced apart from, the master cylinder bore.

13. The brake system of claim 12, including a pedal simulator bore extending into the hydraulic block from the first block side and configured to selectively accept the pedal simulator, the pedal simulator bore extending substantially parallel to the master cylinder bore.

14. The brake system of claim 13, wherein the power transmission unit bore is at least partially interposed between the pedal simulator bore and the master cylinder bore.

15. The brake system of claim 12, wherein a plurality of brake ports, with each brake port corresponding to a selected one of front and rear brakes, are defined in the third block side.

16. The brake system of claim 12, wherein the electronic control unit is associated with the second block side, adjacent the power transmission unit bore, and an ECU cover is attached to the second block side with the electronic control unit interposed between the ECU cover and the second block side, such that the ECU cover substantially encloses the electronic control unit and at least a portion of the hydraulic block.

17. The brake system of claim 12, wherein the first, second, and third block sides are all substantially planar.

18. A brake system for actuating a pair of front wheel brakes and a pair of rear wheel brakes, the system comprising:

a reservoir;

a master cylinder operable during a manual push-through mode by actuation of a brake pedal connected to the master cylinder to generate brake actuating pressure at a first output for hydraulically actuating the pair of front wheel brakes;

a power transmission unit configured for selectively providing pressurized hydraulic fluid for actuating the pair of front wheel brakes and the pair of rear wheel brakes during a normal non-failure braking event;

an electronic control unit for controlling the power transmission unit;

a pedal simulator in selective fluid communication with the master cylinder for providing predetermined brake pedal response; and first and second two-position three-way valves, each three-way valve being hydraulically connected with the master cylinder, the power transmission unit, and a selected one of the front wheel brakes;

each of the first and second three-way valves selectively controlling hydraulic fluid flow from a chosen one of the master cylinder and the power transmission unit to the selected one of the pair of front wheel brakes;

the electronic control module being a first electronic control module, the brake system including a second electronic control module, wherein a chosen one of the first and second electronic control modules controls the power transmission unit, and the other one of the first and second electronic control modules controls the first and second three-way valves.

19. A brake system for actuating a pair of front wheel brakes and a pair of rear wheel brakes, the system comprising:

a reservoir;

a master cylinder operable during a manual push-through mode by actuation of a brake pedal connected to the master cylinder to generate brake actuating pressure at a first output for hydraulically actuating the pair of front wheel brakes;

a power transmission unit configured for selectively providing pressurized hydraulic fluid for actuating the pair of front wheel brakes and the pair of rear wheel brakes during a normal non-failure braking event;

an electronic control unit for controlling the power transmission unit;

a pedal simulator in selective fluid communication with the master cylinder for providing predetermined brake pedal response;

first and second two-position three-way valves, each three-way valve being hydraulically connected with the master cylinder, the power transmission unit, and a selected one of the front wheel brakes;

each of the first and second three-way valves selectively controlling hydraulic fluid flow from a chosen one of the master cylinder and the power transmission unit to the selected one of the pair of front wheel brakes;

a pedal simulator valve interposed fluidically between the pedal simulator and the reservoir; and a pressure switch interposed fluidically between the pedal simulator and the reservoir, the pressure switch selectively providing a switch signal to the electronic control unit, the switch signal being indicative of an operational condition of the pedal simulator valve.

20. A brake system for actuating a pair of front wheel brakes and a pair of rear wheel brakes, the system comprising:

a reservoir;

a master cylinder operable during a manual push-through mode by actuation of a brake pedal connected to the master cylinder to generate brake actuating pressure at a first output for hydraulically actuating the pair of front wheel brakes;

a power transmission unit configured for selectively providing pressurized hydraulic fluid for actuating the pair of front wheel brakes and the pair of rear wheel brakes during a normal non-failure braking event;

an electronic control unit for controlling the power transmission unit;

a pedal simulator in selective fluid communication with the master cylinder for providing predetermined brake pedal response;

first and second two-position three-way valves, each three-way valve being hydraulically connected with the master cylinder, the power transmission unit, and a selected one of the front wheel brakes;

each of the first and second three-way valves selectively controlling hydraulic fluid flow from a chosen one of the master cylinder and the power transmission unit to the selected one of the pair of front wheel brakes; and a pressure sensor located fluidically between the three-way valve and the pedal simulator, the pressure sensor selectively providing a sensor signal to the electronic control unit, the sensor signal being indicative of driver applied pedal force.

* * * * *